(12) United States Patent  (10) Patent No.: US 8,886,811 B2
Gindentuller et al.  (45) Date of Patent: Nov. 11, 2014

(54) METHOD AND DEVICE FOR IMPROVING A BROWSING EXPERIENCE

(75) Inventors: Ilya Gindentuller, San Diego, CA (US); Thomas M. Dillon, La Mesa, CA (US); Michelle L. Koenig, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 250 days.

(21) Appl. No.: 13/274,436

(22) Filed: Oct. 17, 2011

(65) Prior Publication Data

US 2012/0136991 A1  May 31, 2012

Related U.S. Application Data

(60) Provisional application No. 61/417,520, filed on Nov. 29, 2010.

(51) Int. Cl.
| | |
|---|---|
| G06F 15/16 | (2006.01) |
| H04M 1/725 | (2006.01) |
| H04L 29/08 | (2006.01) |
| G06F 17/30 | (2006.01) |

(52) U.S. Cl.
CPC ........... *H04L 67/22* (2013.01); *H04M 1/72561* (2013.01); *H04L 67/02* (2013.01); *G06F 17/30902* (2013.01)
USPC ........... 709/227; 709/203; 709/217; 709/223; 709/245; 709/246; 370/338; 455/410; 455/456.1

(58) Field of Classification Search
USPC ......... 709/202, 203, 212, 217, 224, 226, 228, 709/245, 246, 223, 227
See application file for complete search history.

(56) References Cited

U.S. PATENT DOCUMENTS

| | | | |
|---|---|---|---|
| 6,415,319 B1 | 7/2002 | Ambroziak | |
| 7,020,106 B2 * | 3/2006 | Barnard et al. | 370/329 |
| 7,089,237 B2 * | 8/2006 | Turnbull et al. | 1/1 |
| 7,580,699 B1 * | 8/2009 | Shaw et al. | 455/410 |
| 7,725,472 B2 * | 5/2010 | Uchiyama | 707/758 |
| 8,073,463 B2 * | 12/2011 | Islam et al. | 455/456.1 |
| 8,533,591 B2 * | 9/2013 | Lee et al. | 715/243 |
| 2002/0184095 A1 * | 12/2002 | Scullard et al. | 705/14 |
| 2004/0210628 A1 | 10/2004 | Inkinen | |
| 2009/0287657 A1 | 11/2009 | Bennett | |
| 2010/0057560 A1 * | 3/2010 | Skudlark et al. | 705/14.49 |
| 2012/0155450 A1 * | 6/2012 | Moeller et al. | 370/338 |

* cited by examiner

*Primary Examiner* — Michael Y Won
(74) *Attorney, Agent, or Firm* — Shumaker & Sieffert, P.A.

(57) ABSTRACT

A wireless communication device (200) and method (300) for improving a browsing experience. The method (300) can include: monitoring (310) a user activity in a wireless communication device; providing (320) a program that correlates user activity and the need to access the internet; and pre-activating (330) an internet link, based on the monitored user activity and the program. Advantageously, the pre-activating (330) feature can decrease the time it takes to complete a wireless network connection, thus minimizing wait time. This feature is particularly useful in low and marginal coverage areas.

10 Claims, 4 Drawing Sheets

METHOD AND DEVICE FOR IMPROVING A BROWSING EXPERIENCE

BACKGROUND

1. Field

The present disclosure relates to a method and device for improving a browsing experience.

2. Introduction

As background, Evolution-Data Optimized (EV-DO, etc.) is a 3G telecommunications standard for the wireless transmission of data through radio signals, typically for broadband Internet access (see Wikipedia definition). It uses multiplexing techniques including code division multiple access (CDMA) as well as time division multiple access (TDMA) to maximize both individual users' throughput and the overall system throughput. It is standardized by 3rd Generation Partnership Project 2 (3GPP2) as part of the CDMA2000 family of standards and has been adopted by many mobile phone service providers around the world particularly those previously employing CDMA networks. It is also used on the Globalstar satellite phone network.[1]

EV-DO was designed as an evolution of the CDMA2000 (IS-2000) standard that would support high data rates and could be deployed alongside a wireless carrier's voice services. An EV-DO channel has a bandwidth of 1.25 MHz, the same bandwidth size that IS-95A (IS-95) and IS-2000 (1xRTT) use.[2] The channel structure, on the other hand, is very different. Additionally, the back-end network is entirely packet-based, and thus is not constrained by the restrictions typically present on a circuit switched network.

The EV-DO feature of CDMA2000 networks provides access to mobile devices with forward link air interface speeds of up to 2.4 Mbit/s with Rev. 0 and up to 3.1 Mbit/s with Rev. A. The reverse link rate for Rev. 0 can operate up to 153 kbit/s, while Rev. A can operate at up to 1.8 Mbit/s. It was designed to be operated end-to-end as an IP based network, and so it can support any application which can operate on such a network and bit rate constraints.

TIA-856 Revision 0

The initial design of EV-DO was developed by Qualcomm in 1999 to meet IMT-2000 requirements for a greater-than-2-Mbit/s down link for stationary communications, as opposed to mobile communication such as a moving cellular phone. Initially, the standard was called High Data Rate (HDR), but was renamed to 1xEV-DO after it was ratified by the International Telecommunication Union (ITU); it was given the numerical designation TIA-856. Originally, 1xEV-DO stood for "1x Evolution-Data Only", referring to its being a direct evolution of the 1x (1xRTT) air interface standard, with its channels carrying only data traffic. The title of the 1xEV-DO standard document is "cdma2000 High Rate Packet Data Air Interface Specification", as cdma2000 (lowercase) is another name for the 1x standard, numerically designated as TIA-2000.

Later, possibly due to the possible negative connotations of the word "only", the "DO" part of the standard's name 1x EV-DO was changed to stand for "Data Optimized". So EV-DO now stands for "Evolution-Data Optimized", the 1x prefix has been dropped by the many major carriers, and is marketed simply as EV-DO.[3] This provides a more marketing-friendly emphasis that the technology was optimized for data. Users desire smart electronic devices that can be used to browse the internet quickly and reliably, notwithstanding poor or marginal coverage areas. One example, can include a Motorola Mobility cell phone called the Droid.

It has been observed that in poor and marginal coverage areas, up to 30% of typical data calls can experience delays in EVDO link activation, ranging from about 0.6 seconds to about 7.4 seconds. These types of link activation delays may cause perceptible delays during browsing, especially when accessing data light websites. There is a need for a method and device for improving a browsing experience. There is a further need for improving a browsing experience in a wireless communication device in a poor or marginal coverage area.

It would be considered an improvement in the art, if a wireless communication method, included: monitoring a user activity in a wireless communication device and pre-activating an internet link, based on the monitored user activity and a program that correlates user activity and the need to access the internet. This could expedite connection to a desired link There is yet a further need to provide a smart method and device adapted to provide personalized and reliable browsing experience.

Thus, a method and device that addresses the above problems, would be considered an improvement in the art.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
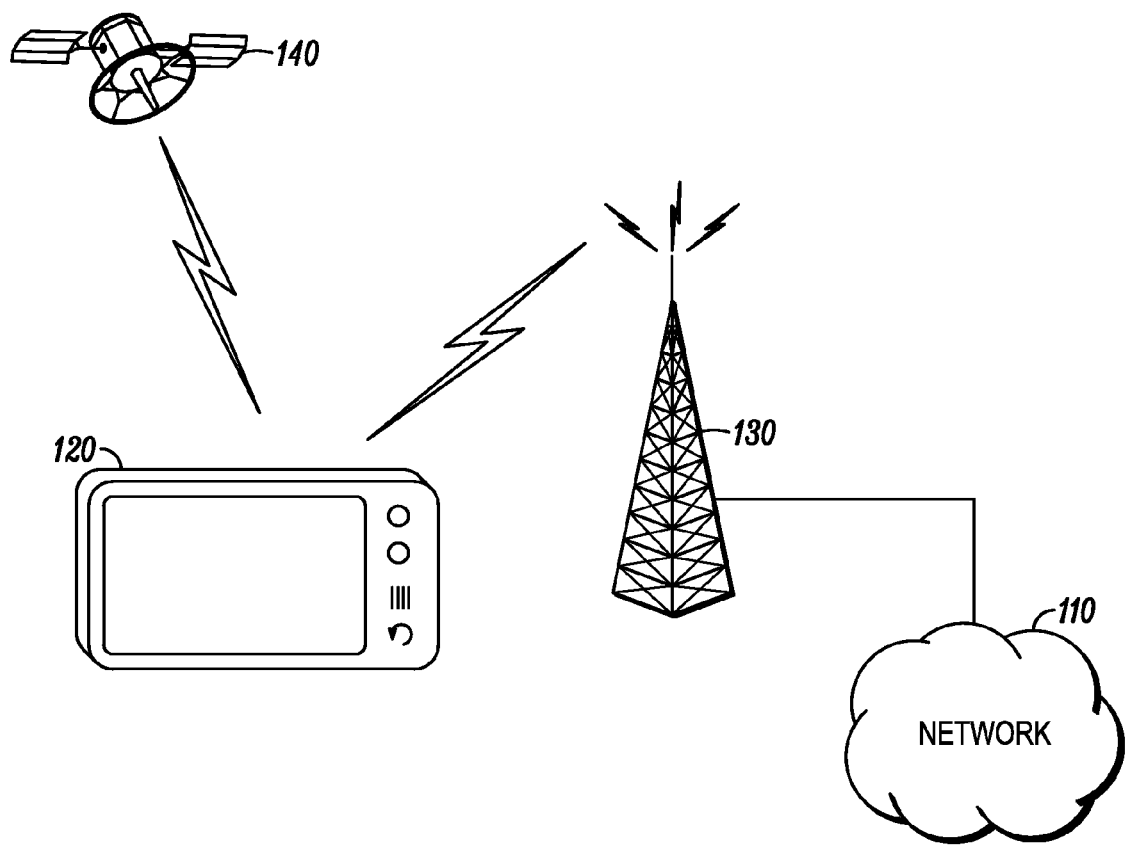
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a tablet, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130, which may also comprise local area, and/or personal area access points. The terminal 120 is shown being in communication with a global positioning system (GPS) satellite 140, global navigation satellite system (GNSS) or the like, for position sensing and determination.

Figure 2:
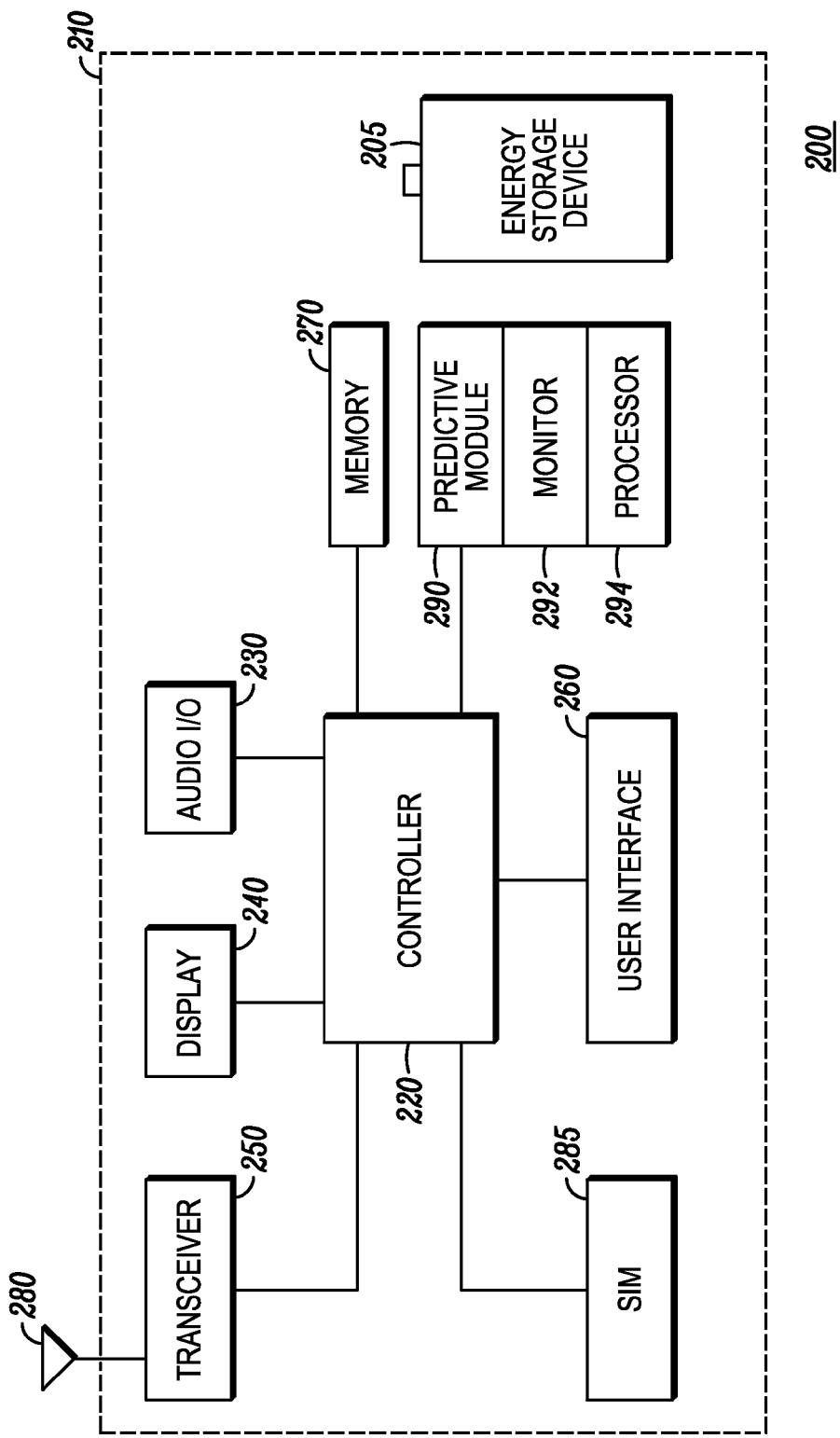
FIG. 2 is an exemplary block diagram of a wireless communication device for improving a browsing experience according to one embodiment.

FIG. 2 is an exemplary block diagram of a wireless communication device 200 configured with an energy storage device or module 205, such as in the terminal 120, for example. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

As shown in FIG. 2, the wireless communication device 200 further includes a predictive module 290 configured to: monitor user activity in a wireless communication device; provide a program that correlates user activity and the need to access the internet; and pre-activate an internet link, based on the monitored user activity and the program. The predictive module can include a monitor 292 and processor 294, as described in more detail below.

In one embodiment, the module 290 can reside within in the controller 220, can reside within the memory 270, can be an autonomous module, can be software, can be hardware, or can be in any other format useful for a module on a wireless communication device 200.

The display 240 can be a liquid crystal display (LCD), a light emitting diode (LED) display, a plasma display, a touch screen display or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch screen or pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 2, can include: a housing 210; a controller 220 coupled to the housing 210, the controller 220 configured to control the operations of the wireless communication device, and to provide ancillary computing operations which may be unrelated to wireless communications such as audio or video processing, application processing, etc. Advantageously, the predictive module 290 can enhance a browsing experience, as provided in more detail below.

Figure 3:
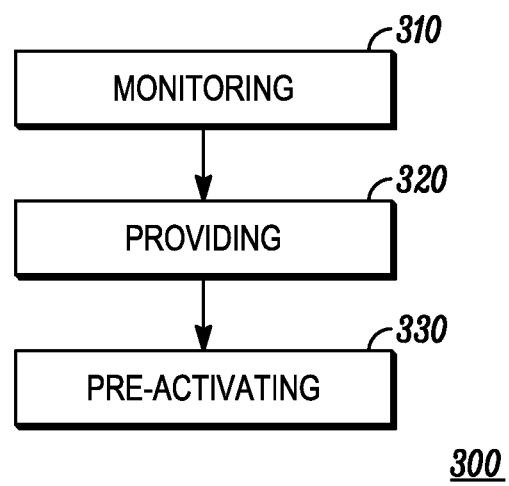
FIG. 3 is an exemplary block diagram of a wireless communication method for improving a browsing experience according to one embodiment.

A block diagram of a wireless communication method 300, is shown in FIG. 3. In its simplest form, it can include: monitoring 310 a user activity in a wireless communication device; providing 320 a program that correlates user activity and the need to access the internet; and pre-activating 330 an internet link, based on the monitored user activity and the program. Advantageously, a pre-activating feature can dramatically decrease the time it takes to complete a wireless network connection, thus minimizing wait time and pleasing a user. In one embodiment, the program can include predicting a desired network link, based on the monitored user activity and historical information stored in memory in the program.

In one embodiment, the program can include a heuristic predictive algorithm that collects and stores user browsing trends by correlating user activity and subsequent internet access (or data aggregation). Correlating user activity and subsequent internet access, allows the program to learn and predict a user's desired internet link, based on the collected and stored user behavior. Advantageously, this feature can help to expedite pre-activating 330 thus decreasing the time it takes to complete a wireless network connection, thus minimizing wait time and pleasing a user.

In another embodiment, the pre-activating step 330 includes substantially immediate triggering of a pre-activation signal when a certain threshold user activity is met. Advantageously, over time the program can become smart based on stored historical data. Thus, once the threshold user activity is met, the pre-activating step 330 is customized and trained to trigger quickly.

In one embodiment, the pre-activating step includes substantially immediate pre-activation when a certain threshold user activity is met, with respect to at least one of: (i) accessing a locally stored favorite; (ii) entering a URL in a browser address window; (ii) entering a search criteria in a search window; (iii) displaying a URL link when it becomes visible; and (iv) the program issues a signal about an impending Internet access.

In one embodiment, the certain threshold is loadable and customizable by a user, by at least one of adjusting a setting and downloading a software program. Advantageously, in one use case, a user can load an application through a USB connection, for example, or download a program to load on a wireless communication device. Similarly, upgrades and customizations can be loaded in any customary way.

In a preferred use case, the pre-activating step 330 includes an internet link including at least one of an EVDO link and an UMTS (Universal Mobile Telecommunications System) link. As previously detailed, it has been observed that in poor and marginal coverage areas, up to 30% of typical data calls experience delays in EVDO link activation, ranging from about 0.6 seconds to about 7.4 seconds. These types of link activation delays may cause perceptible delays during browsing, especially when accessing data light websites. In a preferred use case, monitoring 310 a user activity in a wireless communication device and pre-activating 330 an internet link, based on the monitored 310 user activity and a program that correlates user activity and the need to access the internet, would be beneficial to a user.

In FIG. 2, a wireless communication device 200 with an enhanced browsing experience is shown. The device 200 includes: a housing 210; a controller 220 coupled to the housing 210, the controller 220 configured to control the operations of a wireless communication device; and a predictive module 290 configured to: monitor user activity in a wireless communication device; provide a program that correlates user activity and the need to access the internet; and pre-activate an internet link, based on the monitored user activity and the program. In one embodiment, the predictive module 290 includes a monitor 292 and processor 294.

Advantageously, the predictive module 290, can pre-activate an internet link, based on the monitored user activity and aggregated data in the program to send a signal to quickly connect to a desired internet link.

Figure 4:
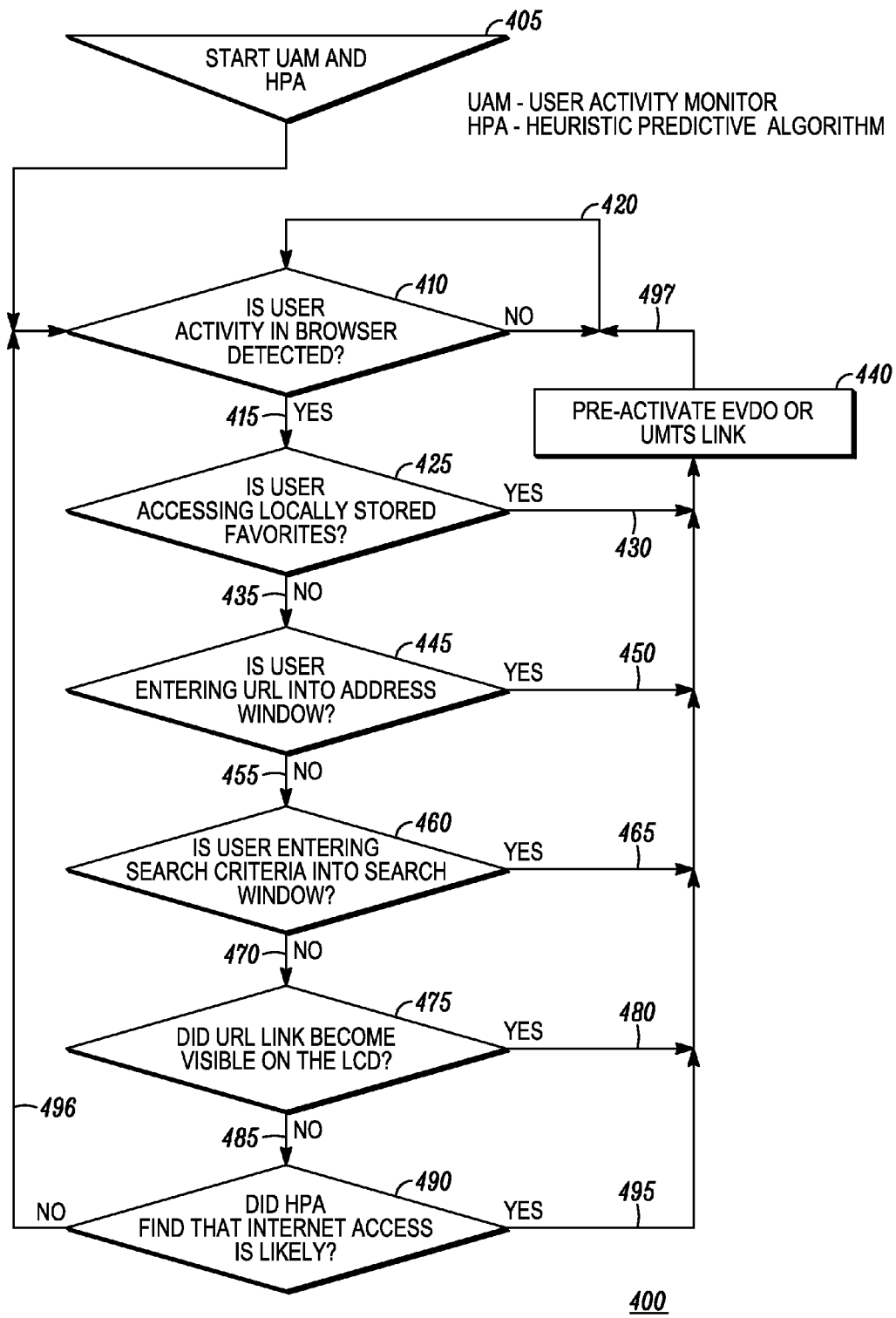
FIG. 4 is an exemplary block diagram of a wireless communication method for improving a browsing experience according to one embodiment.

FIG. 4 is an exemplary flowchart 400 illustrating the operation of the module 290, according to one embodiment. At 405, the flowchart begins by starting the user activity monitor and heuristic predictive algorithm. In decision diamond 410, the inquiry is: Is user activity in a browser detected? If 'yes', at item 415, the flowchart proceeds to decision diamond 425 and if no, at item 420, the flow chart returns to decision diamond 410.

Next, in decision diamond 425, the inquiry is: Is the user accessing a locally stored favorite? If 'yes', at item 430, the flowchart proceeds to pre-activate a link, such as an EVDO or UMTS link at block 440 and if no, at item 435, the flow chart proceeds to decision diamond 445.

At decision diamond 445, the inquiry is: Is the user entering an URL into an address window? If 'yes', at item 450, the flowchart proceeds to pre-activate a link, at block 440 and if no, at item 455, the flow chart proceeds to decision diamond 460.

At decision diamond 460, the inquiry is: Is the user entering search criteria into a search window? If 'yes', at item 465, the flowchart proceeds to pre-activate a link, at block 440 and if no, at item 470, the flow chart proceeds to decision diamond 475. At decision diamond 475, the inquiry is: Did the URL link become visible on a display? If 'yes', at item 480, the flowchart proceeds to pre-activate a link, at block 440 and if no, at item 485, the flow chart proceeds to decision diamond 490.

At decision diamond 490, the inquiry is: Did the heuristic predictive algorithm (HPA) find that internet access is likely? If 'yes', at item 495, the flowchart proceeds to pre-activate a link, at block 440 and if no, at item 500, the flow chart returns to decision diamond 410. After a pre-activate to a link is completed, in block 440, the inquiry returns at line 497 to no at line 420.

The device 200 and method 300 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure. In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A wireless communication method, comprising:
   monitoring use of a wireless communication device over time to produce user activity;
   correlating the user activity and subsequent internet access by the wireless communication device to produce user browsing trends;
   storing the user browsing trends to produce historical browsing trends;
   subsequent to storing the user browsing trends, detecting a use of the wireless communication device to produce a newly detected use;
   predicting, based on the historical browsing trends, whether the newly detected use is likely to result in internet access by the wireless communication device; and
   pre-activating a wireless link used for providing internet access when the newly detected use is predicted to likely result in internet access by the wireless communication device.

2. The wireless communication method of claim 1, wherein the user activity and the subsequent internet access by the wireless communication device are correlated using a heuristic predictive algorithm.

3. The wireless communication method of claim 1, wherein a heuristic predictive algorithm is used for predicting, based on the historical browsing trends, whether the newly detected use will likely result in internet access by the wireless communication device.

4. The wireless communication method of claim 1, wherein the newly detected use includes at least one of:
   accessing a favorite locally stored in a browser;
   entering a URL into an address window of the browser;
   entering search criteria into a search window of the browser; and
   visibly displaying a URL link.

5. The wireless communication method of claim 1, wherein the wireless link includes at least one of an EVDO link and an UMTS link.

6. A wireless communication device, comprising:
   a user interface configured to receive inputs from a user of the wireless communication device;
   a controller coupled to the user interface and configured to control operations of the wireless communication device; and
   a predictive module coupled to the controller and configured to: monitor use of the wireless communication device over time to produce user activity; correlate the user activity and subsequent internet access by the wireless communication device to produce user browsing trends; store the user browsing trends to produce historical browsing trends; subsequent to storing the user browsing trends, detect a use of the wireless communication device to produce a newly detected use; predict, based on the historical browsing trends, whether the newly detected use is likely to result in internet access by the wireless communication device; and pre-activate a wireless link used for providing internet access when the newly detected use is predicted to likely result in internet access by the wireless communication device.

7. The wireless communication device of claim 6, wherein the user activity and the subsequent internet access by the wireless communication device are correlated using a heuristic predictive algorithm.

8. The wireless communication device of claim 6, wherein the newly detected use includes at least one of:
   accessing a favorite locally stored in a browser;
   entering a URL into an address window of the browser;
   entering search criteria into a search window of the browser; and
   visibly displaying a URL link.

9. The wireless communication device of claim 6, wherein a heuristic predictive algorithm is used for predicting, based on the historical browsing trends, whether the newly detected use will likely result in internet access by the wireless communication device.

10. The wireless communication device of claim 6, wherein the wireless link includes at least one of an EVDO link and an UMTS link.

* * * * *